US009996204B2

(12) United States Patent
Dao et al.

(10) Patent No.: US 9,996,204 B2
(45) Date of Patent: Jun. 12, 2018

(54) BALANCING USAGE ACROSS A FOLDABLE DISPLAY

(71) Applicant: Motorola Mobility LLC, Chicago, IL (US)

(72) Inventors: Kevin Dao, Skokie, IL (US); Daniel Hong, Vernon Hills, IL (US); Alex Klement, West Dundee, IL (US); Xiaodong Xun, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 2 days.

(21) Appl. No.: 15/279,159

(22) Filed: Sep. 28, 2016

(65) Prior Publication Data

US 2018/0088699 A1 Mar. 29, 2018

(51) Int. Cl.

*G09G 3/3208* (2016.01)
*G06F 3/044* (2006.01)
*G09G 3/36* (2006.01)

(52) U.S. Cl.

CPC ........... *G06F 3/044* (2013.01); *G09G 3/3208* (2013.01); *G09G 3/36* (2013.01); *G09G 2330/00* (2013.01); *G09G 2380/02* (2013.01)

(58) Field of Classification Search

None
See application file for complete search history.

(56) References Cited

U.S. PATENT DOCUMENTS

2006/0221186 A1* 10/2006 Lin ..................... H04N 7/0122 348/173
2009/0046089 A1 2/2009 Zhuang et al.
2011/0241998 A1* 10/2011 McKinney ........... G06F 1/1616 345/168

* cited by examiner

*Primary Examiner* — Patrick Moon
(74) *Attorney, Agent, or Firm* — Kunzler, PC

(57) ABSTRACT

An apparatus, system, method, and program product are disclosed for balancing usage across a foldable display. A method includes tracking one or more characteristics of an active portion of a foldable display. The active portion of the foldable display includes a portion of the foldable display that is enabled when the display is folded. The method includes determining an inactive portion of the foldable display that is disabled while the active portion of the foldable display is enabled when the display is folded. The method includes activating the inactive portion of the foldable display based on the one or more characteristics of the active portion of the foldable display such that usage of the active and inactive portions of the foldable display is substantially uniform.

14 Claims, 6 Drawing Sheets

BALANCING USAGE ACROSS A FOLDABLE DISPLAY

FIELD

The subject matter disclosed herein relates to displays and more particularly relates to balancing the pixel usage across a foldable display.

BACKGROUND

Some electronic displays may have lifetime and "burn-in" issues. Pixel excitation or activation may vary over the lifetime of a display, and the pixel material may accordingly decay over time. The pixel material, however, may not decay evenly due to differences in pixel usage. Furthermore, uneven usage of the pixels may be exacerbated in a foldable display device where entire portions of the display may be enabled or activated more than other portions. The longer activation of the pixels in some portions of the foldable display and not others may cause usage imbalance and burn-in issues.

BRIEF SUMMARY

An apparatus for balancing usage across a foldable display is disclosed. A method and computer program product also perform the functions of the apparatus. The apparatus includes a foldable display, a processor, and a memory that stores code executable by the processor. In one embodiment, the code is executable by the processor to track one or more characteristics of an active portion of the foldable display. The active portion of the foldable display includes a portion of the foldable display that is enabled when the display is folded.

The code, in a further embodiment, is executable by the processor to determine an inactive portion of the foldable display that is disabled while the active portion of the foldable display is enabled when the display is folded. In various embodiments, the code is executable by the processor to activate the inactive portion of the foldable display based on the one or more characteristics of the active portion of the foldable display such that usage of the active and inactive portions of the foldable display is substantially uniform.

In some embodiments, the code is further executable by the processor to activate the inactive portion of the foldable display while an information handling device operably coupled to the foldable display is connected to a power supply capable of charging the information handling device. In certain embodiments, the code is executable by the processor to periodically activate the inactive portion of the foldable display while an information handling device operably coupled to the foldable display is connected to a battery power supply.

In one embodiment, the one or more characteristics include color attributes and/or brightness attributes for a plurality of pixels of the active portion of the foldable display. In some embodiments, the one or more characteristics include averages of the color attributes and/or the brightness attributes for the plurality of pixels of the active portion of the foldable display over a predetermined tracking period.

In some embodiments, the inactive portion of the foldable display is activated by displaying one or more images on the inactive portion of the foldable display. In various embodiments, the code is further executable by the processor to select the one or more images displayed on the inactive portion of the foldable display based on the one or more characteristics of the active portion of the foldable display.

In one embodiment, the code is further executable by the processor to determine an acceleration factor that is used to select images for accelerating activation of the inactive portion of the foldable display based on a time period for activating the inactive portion of the foldable display. In a further embodiment, the code is further executable by the processor to select one or more images for activating the inactive portion of the foldable display comprising characteristics that satisfy a predetermined threshold. The predetermined threshold may be determined as a function of the one or more characteristics of the active portion of the foldable display and the acceleration factor.

In some embodiments, the code is further executable by the processor to determine a fold boundary where the foldable display is folded between the active portion of the foldable display and the inactive portion of the foldable display. In a further embodiment, the code is further executable by the processor to activate a plurality of pixels along the fold boundary in both the active and inactive portions of the foldable display according to one or more characteristics of the pixels along the fold boundary to reduce the noticeability of the fold boundary. In one embodiment, the foldable display comprises an active-matrix organic light-emitting diode ("AMOLED") display.

A method, in one embodiment, includes tracking one or more characteristics of an active portion of a foldable display. The active portion of the foldable display may include a portion of the foldable display that is enabled when the display is folded. In some embodiments, the method includes determining an inactive portion of the foldable display that is disabled while the active portion of the foldable display is enabled when the display is folded. The method, in a further embodiment, includes activating the inactive portion of the foldable display based on the one or more characteristics of the active portion of the foldable display such that usage of the active and inactive portions of the foldable display is substantially uniform.

The method, in various embodiments, includes activating the inactive portion of the foldable display while an information handling device operably coupled to the foldable display is connected to a power supply capable of charging the information handling device. In some embodiments, the method includes periodically activating the inactive portion of the foldable display while an information handling device operably coupled to the foldable display is connected to a battery power supply.

In some embodiments, the one or more characteristics include color attributes and/or brightness attributes for a plurality of pixels of the active portion of the foldable display. In one embodiment, the one or more characteristics include averages of the color attributes and/or the brightness attributes for the plurality of pixels of the active portion of the foldable display over a predetermined tracking period.

In various embodiments, the inactive portion of the foldable display is activated by displaying one or more images on the inactive portion of the foldable display. In a further embodiment, the method includes selecting the one or more images displayed on the inactive portion of the foldable display based on the one or more characteristics of the active portion of the foldable display.

In one embodiment, the method includes determining an acceleration factor that includes a factor used to select images for accelerating activation of the inactive portion of the foldable display based on a time period for activating the inactive portion of the foldable display. In some embodiments, the method includes selecting one or more images for activating the inactive portion of the foldable display comprising characteristics that satisfy a predetermined threshold. The predetermined threshold may be determined as a function of the one or more characteristics of the active portion of the foldable display and the acceleration factor.

The method, in some embodiments, includes determining a fold boundary where the foldable display is folded between the active portion of the foldable display and the inactive portion of the foldable display. In various embodiments, the method includes activating a plurality of pixels along the fold boundary in both the active and inactive portions of the foldable display according to one or more characteristics of the pixels along the fold boundary to reduce the noticeability of the fold boundary.

A program product, in one embodiment, includes a computer readable storage medium that stores code executable by a processor. In some embodiments, the executable code includes code to perform tracking one or more characteristics of an active portion of a foldable display. The active portion of the foldable display may include a portion of the foldable display that is enabled when the display is folded. In certain embodiments, the executable code includes code to perform determining an inactive portion of the foldable display that is disabled while the active portion of the foldable display is enabled when the display is folded. In a further embodiment, the executable code includes code to perform activating the inactive portion of the foldable display based on the one or more characteristics of the active portion of the foldable display such that usage of the active and inactive portions of the foldable display is substantially uniform.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
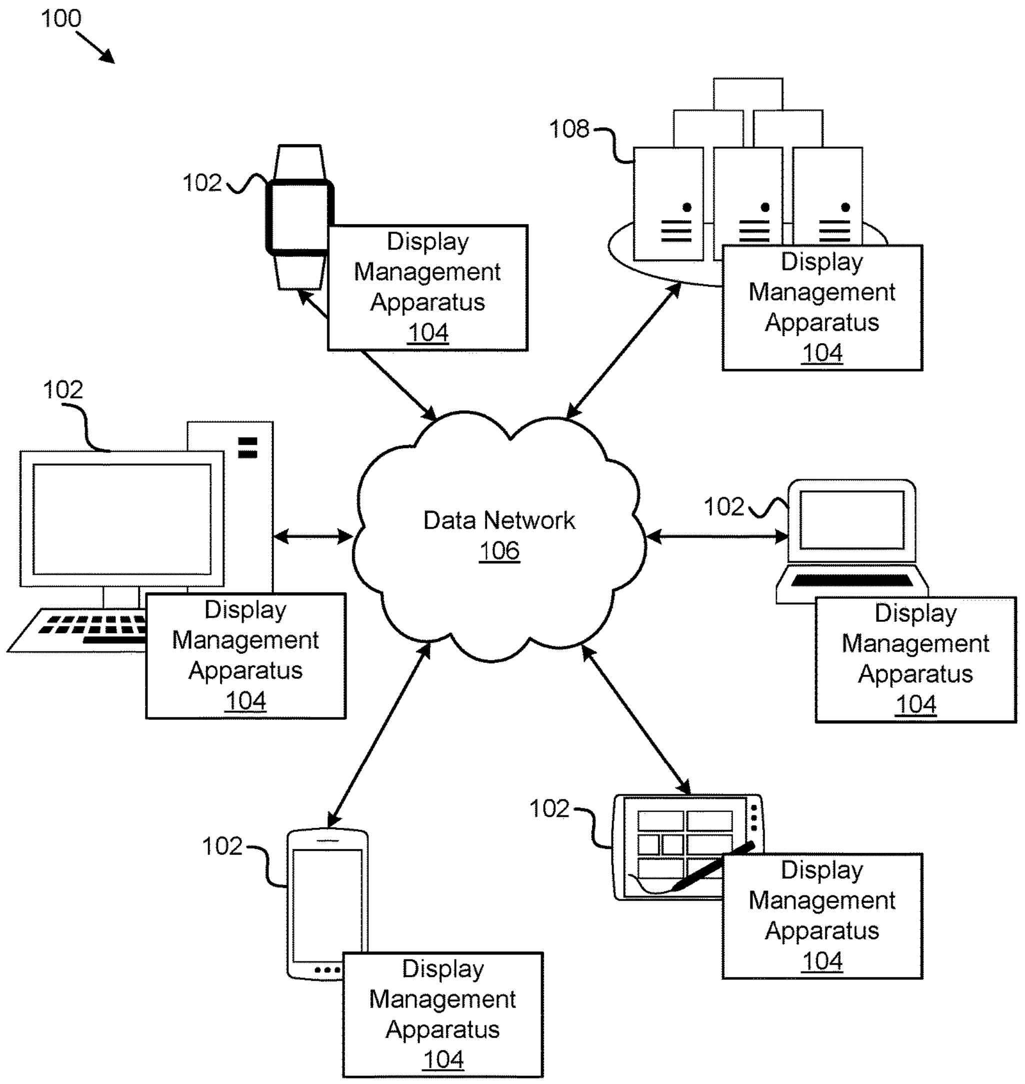
FIG. 1 is a schematic block diagram illustrating one embodiment of a system for balancing usage across a foldable display.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for balancing usage across a foldable display. In one embodiment, the system 100 includes one or more information handling devices 102, one or more display management apparatuses 104, one or more data networks 106, and one or more servers 108. In certain embodiments, even though a specific number of information handling devices 102, display management apparatuses 104, data networks 106, and servers 108 are depicted in FIG. 1, one of skill in the art will recognize, in light of this disclosure, that any number of information handling devices 102, display management apparatuses 104, data networks 106, and servers 108 may be included in the system 100 for gesture detection.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108.

In one embodiment, the information handling devices 102 include a foldable display. As used herein, a foldable display is a display that is flexible, rollable, foldable, and/or the like while the display is on or off. For example, a foldable display may be a display that can be folded at one or multiple fold points along the display. In such an embodiment, the portion of the display that is folded (e.g., folded behind another portion of the display) may be disabled, inactivated, or turned off, while the unfolded portion may remain enabled, activated, or turned on. More specifically, the pixels of the folded portion may be disabled, inactivated, or turned off while the pixels of the unfolded portion may remain enabled, activated, or turned on.

The foldable display may be integrated into a device, such as a smart phone or tablet display, or may be operably coupled to a device, such as a laptop computer, a desktop computer, or the like, using a display connection such as a high-definition multimedia interface ("HDMI") connection, or the like. In certain embodiments, the foldable display is a liquid crystal display ("LCD"), a light emitting diode ("LED") display, an organic LED display ("OLED"), an active-matrix OLED display ("AMOLED"), or the like.

In one embodiment, the display management apparatus 104 is configured to track usage characteristics of pixels across a foldable display and balance the usage of the pixels such that the pixel usage across the foldable display is substantially uniform. The display management apparatus 104, in one embodiment, is configured to track one or more characteristics of an active portion of a foldable display that is enabled when the display is folded. The display management apparatus 104, in a further embodiment, is configured to determine an inactive portion of the foldable display that is disabled while the active portion of the foldable display is enabled when the display is folded. In certain embodiments, the display management apparatus 104 is configured to activate the inactive portion of the foldable display based on the one or more characteristics of the active portion of the foldable display such that usage of the active and inactive portions of the foldable display is substantially uniform. The display management apparatus 104, including its various sub-modules, may be located on one or more information handling devices 102 in the system 100, one or more servers 108, one or more network devices, and/or the like. The display management apparatus 104 is described in more detail below with reference to FIG. 2.

In one embodiment, the display management apparatus 104 improves the functionality and/or usability of the computer, computing technology, computing environment, computer display, or the like, by reducing or eliminating the effects of screen "burn in" in a foldable display. As used herein, "burn in" refers to discoloration of a display caused by cumulative non-uniform usage of the pixels of the display, such as when a portion of a foldable display is activated or turned on for a longer period of time than a different portion of the foldable display that is folded. The display management module 104, accordingly, tracks pixel usage across portions of a foldable display and adjusts portions of the foldable display that are inactive or not turned on to balance the usage of the pixels of the display in an attempt to make the pixel usage uniform across the entire foldable display.

In various embodiments, the display management apparatus 104 may be embodied as a hardware appliance that can be installed or deployed on an information handling device 102, on a server 108, or elsewhere on the data network 106. In certain embodiments, the display management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the display management apparatus 104 may include a power interface, a wired and/or wireless network interface, a graphical interface that attaches to a display, and/or a semiconductor integrated circuit device as described below, configured to perform the functions described herein with regard to the display management apparatus 104.

The display management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the display management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the display management apparatus 104.

The semiconductor integrated circuit device or other hardware appliance of the display management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the display management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. For example, a server 108 may store images, programs, or the like used by the display management module 104 to balance pixel usage across a foldable display.

Figure 2:
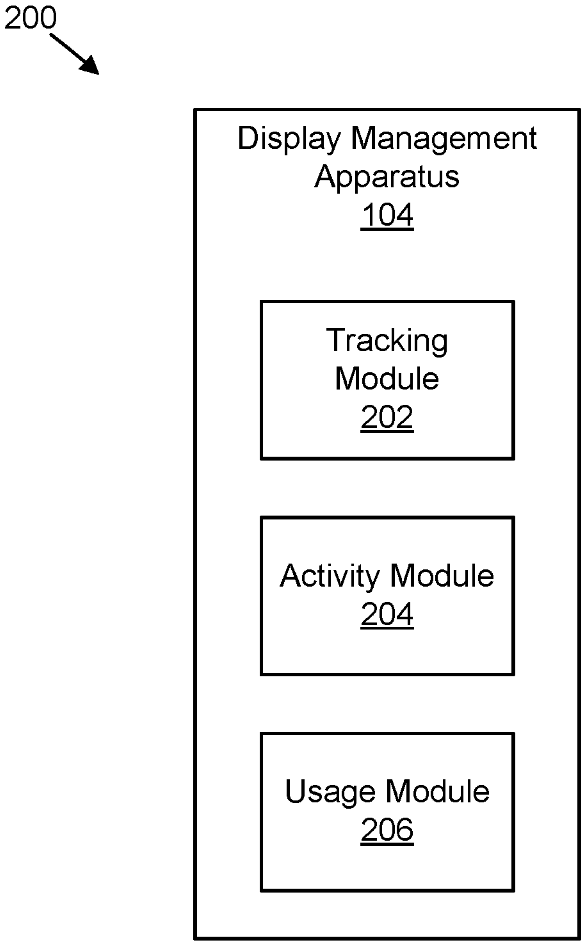
FIG. 2 is a schematic block diagram illustrating one embodiment of an apparatus for balancing usage across a foldable display.

FIG. 2 depicts one embodiment of an apparatus 200 for balancing usage across a foldable display. In one embodiment, the apparatus 200 includes an embodiment of display management module 104. The display management module 104, in certain embodiments, includes a tracking module 202, an activity module 204, and a usage module 206, which are described in more detail below.

The tracking module 202, in one embodiment, tracks usage characteristics on an active portion of the foldable display while it is active and while a portion of the foldable display is folded and inactive. As discussed above, when a portion of the foldable display is folded, e.g., folded behind another portion of the display such that it is out of a user's field of view, the pixels of the folded portion may be disabled, inactivated, or turned off. In one embodiment, the tracking module 202 begins tracking usage characteristics of the active portion of the display, e.g., the unfolded portion or the portion of the display that the user is still using, when the folded portion of the display is folded.

The characteristics may include characteristics associated with each pixel of the active portion of the foldable display such as color attributes, e.g., red/green/blue ("RGB") values, brightness attributes, and/or the like. The tracking module 202 may track the characteristics for a predetermined tracking period, such as for minutes, hours, or the entire time that the active portion of the foldable display is enabled. In some embodiments, the tracking module 202 calculates averages of the color attributes, brightness attributes, and/or the like for the predetermined tracking period and uses the calculated averages as the determined characteristics for the active portion of the foldable display.

The activity module 204, in one embodiment, determines an inactive portion of the foldable display that is disabled while the active portion of the foldable display is enabled when the display is folded. The inactive portion, for example, may include the pixels that comprise the portion of the foldable display that is folded, bended, rolled, or the like behind another portion of the foldable display. In a further example, the foldable display may include one or more predefined fold points such that when a portion of the foldable display is folded at one of the predefined fold points, that portion of the foldable display is disabled. The tracking module 202 and/or the activity module 204 may track how long the folded portion of the foldable display is folded and/or inactive/disabled/turned off.

The usage module 206, in one embodiment, activates the inactive portion of the foldable display based on the characteristics of the active portion of the foldable display that the tracking module 202 tracked. In certain embodiments, the usage module 206 activates the inactive portion of the foldable display to balance or even the usage of the pixels across the entire foldable display and reduce the effects of "burn in" caused by some pixels being active more than other pixels on the foldable display. In one embodiment, the usage module 206 activates the inactive portion of the foldable display when an information handling device 102 operably coupled to the foldable display is not actively being used.

In one embodiment, the usage module 206 activates the inactive portion of the foldable display, or more particularly, activates the pixels of the inactive portion of the foldable display by displaying one or more images on the inactive portion of the foldable display. The one or more images may be selected based on the characteristics of the active portion of the foldable display, as described in more detail below. In certain embodiments, the usage module 206 presents images for a predetermined period of time until the usage characteristics of the inactive portion of the foldable display are substantially similar to the usage characteristics of the portion of the foldable display that was active while the foldable display was folded.

In some embodiments, the usage module 206 activates the inactive portion of the foldable display by enabling the pixels of the inactive portion to display various colors at various brightness levels for various amounts of time based on the usage characteristics of the active portion of the foldable display that the tracking module 202 collected. For example, the usage module 206 may activate the pixels of the inactive portion of the display to show various shades of red, green, blue, and/or other colors at various brightness levels to approximate the pixel usage, or average pixel usage, of the active portion of the foldable display.

In one embodiment, the usage module 206 activates the inactive portion of the foldable display while an information handling device 102 that is operably coupled to the foldable display is connected to a power supply that is capable of charging a battery source for the information handling device. For example, the usage module 206 may present one or more images on the inactive portion of a foldable display operably coupled to a tablet computer when the tablet computer is connected to a steady or reliable power source, such as being plugged into an A/C power source that is capable of charging the tablet computer.

In some embodiments, the usage module 206 activates the inactive portion of the foldable display while an information handling device 102 that is operably coupled to the foldable display is connected to a battery power supply. In such an embodiment, the usage module 206 may periodically, e.g., at certain intervals and for a predetermined amount of time, use the battery power to display one or more images on the inactive portion of the foldable display. The usage module 206, for example, may display images on the inactive portion of the display for an amount of time that is calculated as a function of the amount of battery life remaining and an amount of time that the user actively uses the information handling device 102. For example, if the battery has an hour of life remaining, but the user, on average, uses the information handling device 102 for 45 minutes per hour, then the usage module 206 may activate the inactive portion of the display for, at most, 15 minutes per hour of remaining battery life.

In this manner, the display management module 104 balances the usage of the pixels of the entire foldable display such that the pixel usage is substantially uniform for the entire foldable display. This may reduce the noticeability of the differences of the pixel usage between the more active portions of the foldable display and the inactive portions of the foldable display when the inactive portions are folded and unused.

Figure 3:
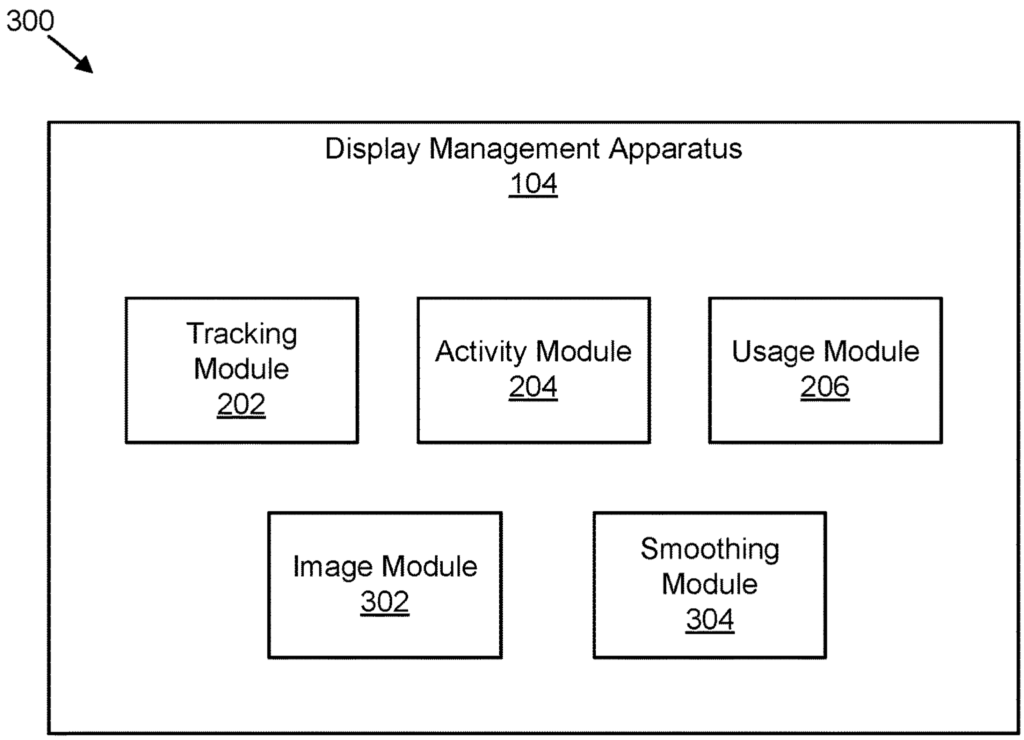
FIG. 3 is a schematic block diagram illustrating one embodiment of another apparatus for balancing usage across a foldable display.

FIG. 3 depicts one embodiment of an apparatus 300 for balancing usage across a foldable display. In one embodiment, the apparatus 300 includes an embodiment of display management module 104. The display management module 104, in certain embodiments, includes a tracking module 202, an activity module 204, and a usage module 206, which may be substantially similar to the tracking module 202, the activity module 204, and the usage module 206 described above with reference to FIG. 2. In a further embodiment, the display management module 104 includes one or more of an image module 302 and a smoothing module 304, which are described in more detail below.

The image module 302, in one embodiment, selects one or more images for the usage module 206 to display on the inactive portion of the foldable display based on the one or more characteristics of the active portion of the foldable display. For example, if the tracking module 202 determines that the average color attributes, e.g., the average RGB values, for the active portion of the display while the active portion was active (e.g., while the foldable display was folded) is 156/147/133 R/G/B, the image module 302 may select one or more images from an image database that provides average R/G/B values of 156/147/133, based on details, information, or metadata associated with each image.

In some embodiments, the image module 302 selects a plurality of different images that the usage module 206 displays on the inactive portion of the foldable display, and for various amounts of time, to substantially approximate the usage characteristics of the active portion of the foldable display. For example, the image module 302 may select a plurality of different images that cumulatively have an average RGB value and an average brightness value that is substantially similar to the average RGB value and average brightness of the active portion of the foldable display that was enabled for a period of time. The image module 302 may also determine an amount of time that each image should be presented on the inactive portion of the foldable display to approximate the pixel usage of the active portion of the foldable display. In some embodiments, the image module 302 may also determine a brightness level for each selected image, and the usage module 206 may dynamically set the brightness of the foldable display via the information handling device 102 settings according to the brightness level for each image.

In one embodiment, the image module 302 determines an acceleration factor for displaying the images on the inactive portion of the foldable display. As used herein, an acceleration factor is a factor used to select images for accelerating activation of the inactive portion of the foldable display. The acceleration factor may be determined based on an amount of time that is available to activate the inactive portion of the foldable display, e.g., an amount of battery life remaining, an amount of charge time remaining, and/or the like. For example, if the tracking module 202 determines that the average brightness level of pixels of the active portion of the foldable display was a five for an hour of usage, but there is only thirty minutes of battery life remaining to activate the inactive portion of the foldable display, the image module 302 may select one or more images that have an average brightness level of ten to account for the shortened period of time.

In such an example, the image module 302 may determine that the acceleration factor is two. The image module 302 may consider other characteristics, such as the RGB values, and/or the like, of the active portion of the foldable display to determine the acceleration factor. In such an embodiment, the image module 302 may select one or more images that cumulatively, in combination, or independently have characteristics that satisfy a predetermined threshold that is calculated as a function of the characteristics of the active portion of the foldable display (e.g., the RGB values, the brightness value, etc.), and the acceleration factor, as described with the above example.

The smoothing module 304, in one embodiment, determines one or more fold boundaries of the foldable display. A fold boundary, as used herein, is a part of the foldable display where the foldable display may be folded, and when it is folded, creates a boundary between the active portion of the foldable display and the inactive portion of the foldable display. Based on the determined fold boundary, the smoothing module 304 activates a plurality of pixels along the fold boundary in both the active and inactive portions of the foldable display based on the one or more characteristics of the pixels along the fold boundary to reduce the noticeability of the fold boundary.

For example, the smoothing module 304 may use the usage characteristics of the pixels of the active portion of the foldable display within a predetermined width of the fold boundary, e.g., within a 50-pixel width, to activate the pixels of the inactive portion of the foldable display with the same pixel width, e.g., to select one or more images to present within that pixel width, so that the fold boundary is not noticeable when the foldable display is not folded. In another example, the smoothing module 304 may present images with a predetermined pixel width of the fold boundary of the active portion of the foldable display that reduces or lessens the usage characteristics of the determined pixels, e.g., images that have lower RGB attributes or lower brightness attributes, while at the same time presenting images on the inactive portion of the foldable display within the predetermined pixel width of the fold boundary that have the same or higher RGB or brightness attributes such that the pixels around the fold boundary have substantially uniform usage characteristics.

In a further embodiment, the smoothing module 304 averages the usage characteristics of the pixels of the active portion of the display within the predefined pixel width from the fold boundary and determines one or more images to display within the same pixel width of the inactive portion of the display based on the average values. For example, if the average RGB color values for the predefined pixel width is 150/110/190, the smoothing module 304 determines one or more images that, when each are presented for a predefined period of time, will generate average pixel values for the pixels within the predefined pixel width such that the usage characteristics of the pixels along the fold boundary are substantially similar so that there is not a noticeable line, edge, boundary, or the like along the fold boundary caused by "burn in" or uneven usage of the pixels.

Figure 4A:
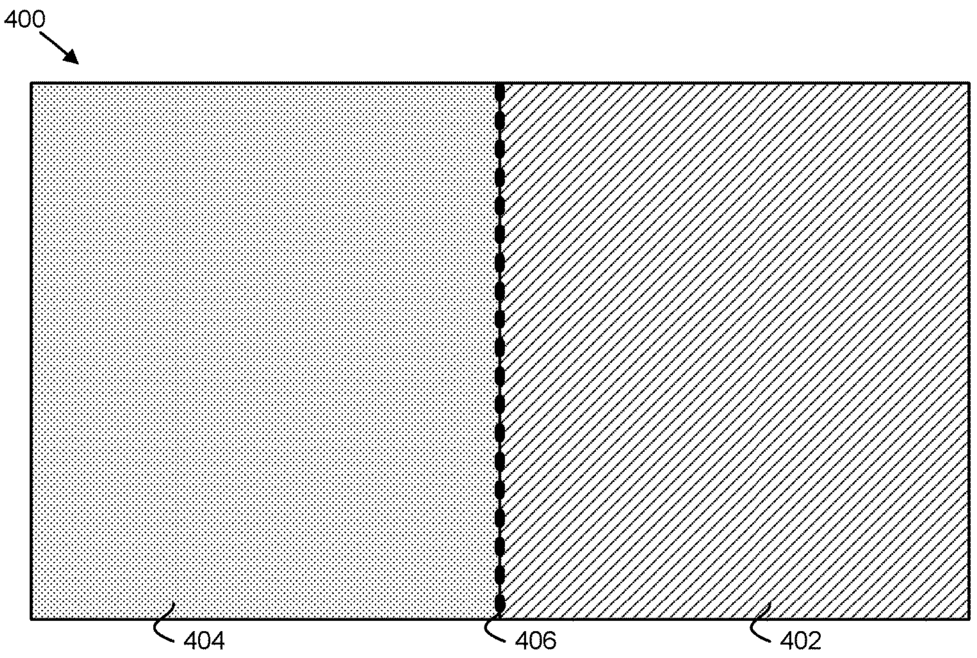
FIG. 4A is a schematic block diagram illustrating one embodiment of a foldable display.
Figure 4B:
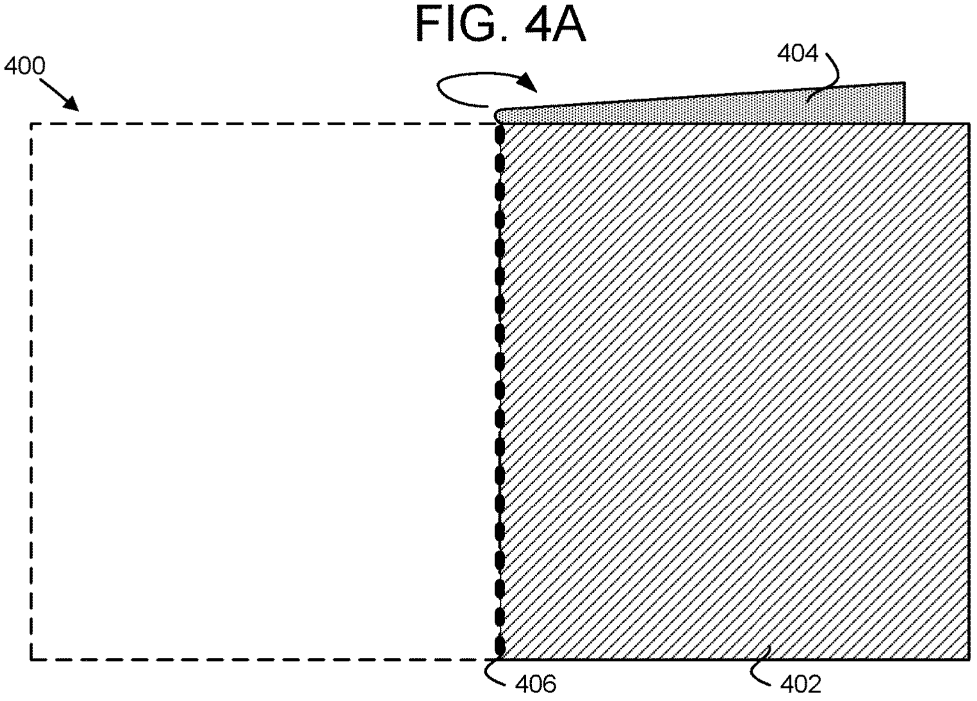
FIG. 4B is a schematic block diagram illustrating another embodiment of a foldable display.

FIGS. 4A and 4B illustrate one embodiment of a foldable display 400. In one embodiment, the foldable display 400 has a fold boundary 406 separating two different portions 402/404 of the display 400. The foldable display 400 may be used, for example as shown in FIG. 4A, in a tablet mode such that the entire display 400 can be used to present content. In a further embodiment, as shown in FIG. 4B, a portion 404 of the display 400 may be folded behind a different portion 402 of the display 400 at a fold boundary 406 to enable a phone mode, for example. In such an embodiment, only the portion 402 of the display 400 that is visible to a user is enabled or active, while the folded portion 404 is disabled.

Because the active portion 402 of the display 400 is used more than the inactive portion 404 when the display 400 is folded, the pixel usage across the entire display 400 is not uniform, and therefore differences in pixel color, brightness, or the like may be noticeable due to the effects of "burn in." Accordingly, the subject matter disclosed herein alleviates the "burn in" effect by tracking the usage characteristics, e.g., the color attributes, the brightness attributes, the amount of time that the pixels have been enabled, etc., of the active portion 402 of the display 400 while the display 400 is folded. Based on the usage characteristics, the inactive portion 404 of the display 400 can be activated by presenting one or more images, for example, that have similar attributes, e.g., color, brightness, etc., as the tracked usage characteristics. The images may be presented for a predetermined amount of time, based on how long the inactive portion 404 of the display 400 was inactive and/or how long the active portion 402 of the display 400 was active. The images may be presented on the inactive portion of the display 400 while an information handling device 102 operably coupled to the display 400 is plugged in and charging, is connected to battery power, and/or the like.

Figure 5:
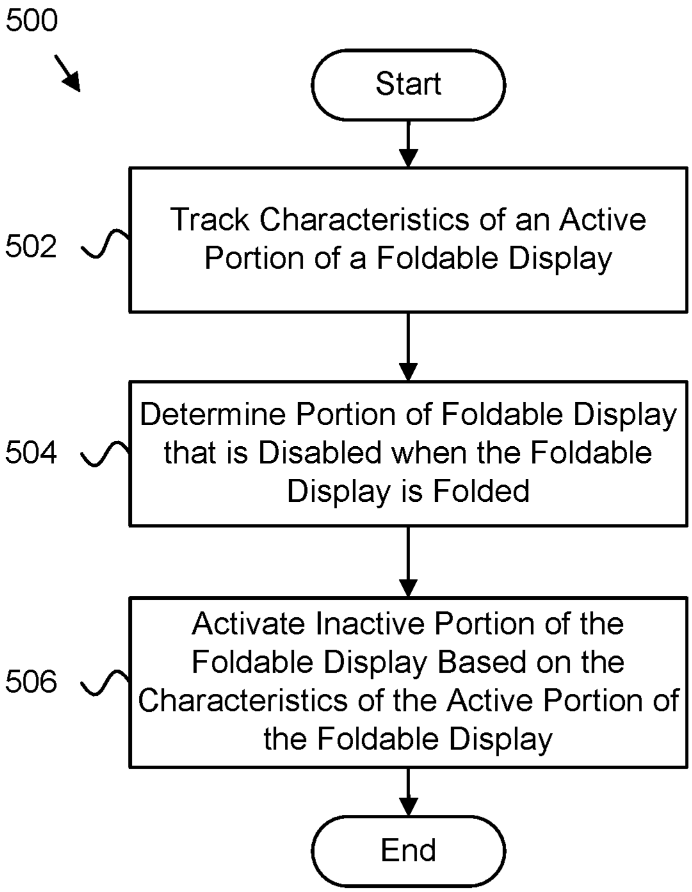
FIG. 5 is a schematic flow chart diagram illustrating one embodiment of a method for balancing usage across a foldable display.

FIG. 5 depicts one embodiment of a method 500 for balancing usage across a foldable display. In one embodiment, the method 500 begins, and the tracking module 202 tracks 502 one or more characteristics of an active portion of a foldable display. The active portion of the foldable display may include a portion of the foldable display that is enabled when the display is folded.

In a further embodiment, the activity module 204 determines 504 an inactive portion of the foldable display that is disabled while the active portion of the foldable display is enabled when the display is folded. In certain embodiments, the usage module 506 activates 506 the inactive portion of the foldable display based on the one or more characteristics of the active portion of the foldable display such that usage of the active and inactive portions of the foldable display is substantially uniform, and the method 500 ends.

Figure 6:
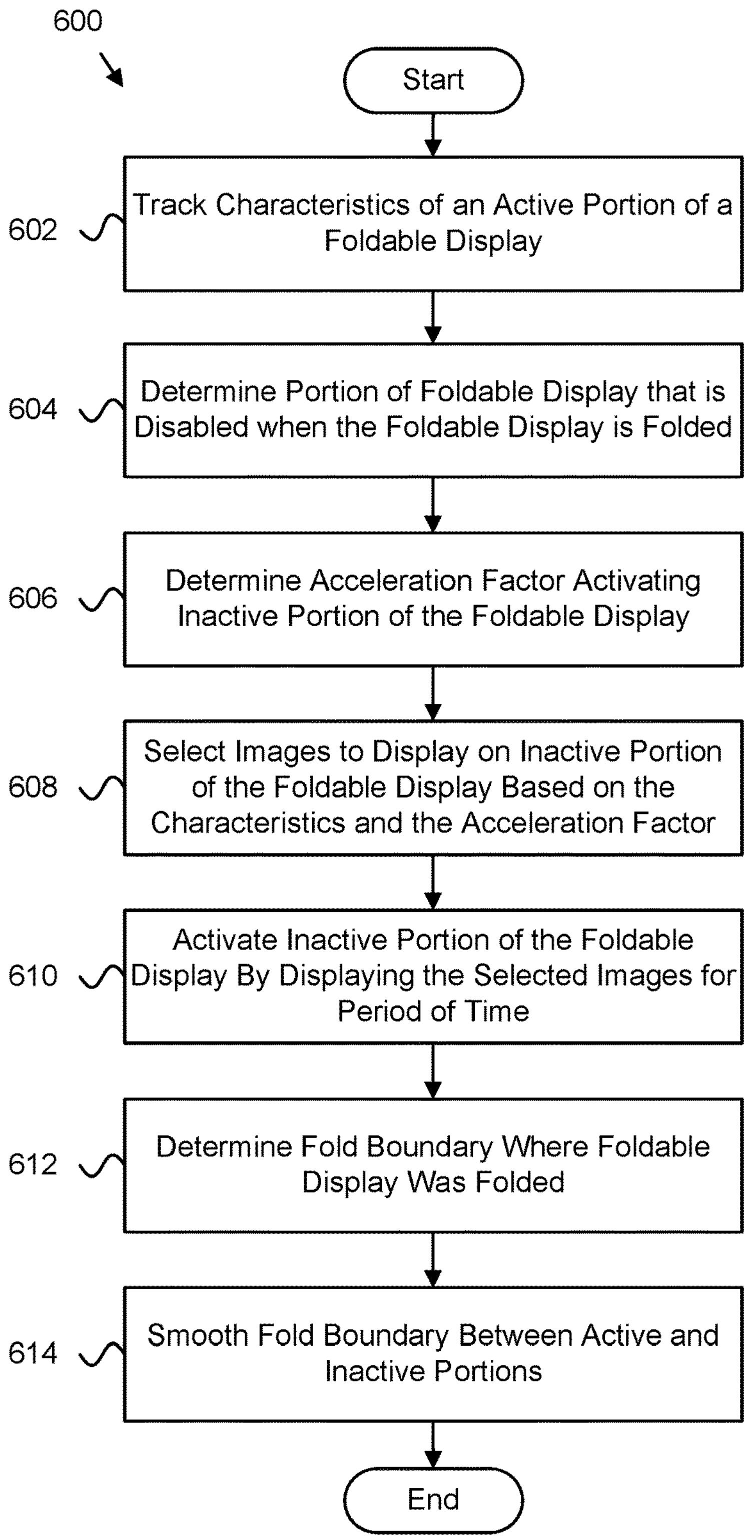
FIG. 6 is a schematic flow chart diagram illustrating one embodiment of another method for balancing usage across a foldable display.

FIG. 6 depicts one embodiment of a method 600 for balancing usage across a foldable display. In one embodiment, the method 600 begins and the tracking module 202 tracks 602 one or more characteristics of an active portion of a foldable display. The activity module 204, in some embodiments, determines 604 an inactive portion of the foldable display that is disabled while the active portion of the foldable display is enabled when the display is folded.

In one embodiment, the image module 302 determines 606 an acceleration factor for activating the inactive portion of the foldable display. The acceleration factor may be a factor used to determine color values, brightness values, and/or the like used for activating the inactive portion of the foldable display based on a determined period of time for activating the inactive portion of the foldable display. The image module 302 may select 608 images to display on the inactive portion of the foldable display based on the characteristics tracked by the tracking module 202 and the determined acceleration factor. The images, for example, may be stored in a local data store, in the cloud, or the like, and may be referenced by various color attributes, brightness attributes, and/or the like.

The usage module 206 may activate 610 the inactive portion of the foldable display by displaying the selected images for a predefined period of time, which may be based on the characteristics of the active portion of the display and the acceleration factor. In a further embodiment, the smoothing module 304 determines 612 a fold boundary where the foldable display is folded, and smooths 614 the fold boundary between the active and inactive portions of the foldable display to reduce the noticeability of a line, edge, boundary, or the like. For example, the smoothing module 304 may activate the pixels within a predefined width along the fold boundary on the inactive portion of the display using average pixel values, e.g., color or brightness values, such that the pixel usage along the fold boundary is substantially uniform, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a foldable display of an information handling device;

a processor;

a memory that stores code executable by the processor to:

track one or more characteristics of an active portion of the foldable display, the active portion of the foldable display comprising a portion of the foldable display that is enabled when the display is folded;

determine an inactive portion of the foldable display that is disabled while the active portion of the foldable display is enabled when the display is folded;

select one or more images to display on the inactive portion of the foldable display, based on the one or more characteristics of the active portion of the foldable display, the one or more images selected based on an acceleration factor, the acceleration factor determined as a function of an amount of time remaining to fully charge the information handling device; and activate the inactive portion of the foldable display by displaying the one or more images on the inactive portion of the foldable display while the information handling device is being charged such that usage of the active and inactive portions of the foldable display is substantially uniform.

2. The apparatus of claim 1, wherein the code is further executable by the processor to periodically activate the inactive portion of the foldable display while the information handling device is connected to a battery power supply.

3. The apparatus of claim 1, wherein the one or more characteristics comprise one or more of color attributes and brightness attributes for a plurality of pixels of the active portion of the foldable display.

4. The apparatus of claim 3, wherein the one or more characteristics comprise averages of one or more of the color attributes and the brightness attributes for the plurality of pixels of the active portion of the foldable display over a predetermined tracking period.

5. The apparatus of claim 1, wherein the code is further executable by the processor to select one or more images for activating the inactive portion of the foldable display comprising characteristics that satisfy a predetermined threshold, the predetermined threshold determined as a function of the one or more characteristics of the active portion of the foldable display and the acceleration factor.

6. The apparatus of claim 1, wherein the code is further executable by the processor to:

determine a fold boundary where the foldable display is folded between the active portion of the foldable display and the inactive portion of the foldable display; and activate a plurality of pixels along the fold boundary in both the active and inactive portions of the foldable display according to one or more characteristics of the pixels along the fold boundary to reduce the noticeability of the fold boundary.

7. The apparatus of claim 1, wherein the foldable display comprises an active-matrix organic light-emitting diode ("AMOLED") display.

8. A method comprising:

tracking one or more characteristics of an active portion of a foldable display of an information handling device, the active portion of the foldable display comprising a portion of the foldable display that is enabled when the display is folded;

determining an inactive portion of the foldable display that is disabled while the active portion of the foldable display is enabled when the display is folded;

selecting one or more images to display on the inactive portion of the foldable display, based on the one or more characteristics of the active portion of the foldable display, the one or more images selected based on an acceleration factor, the acceleration factor determined as a function of an amount of time remaining to fully charge the information handling device; and activating the inactive portion of the foldable display by displaying the one or more images on the inactive portion of the foldable display while the information handling device is being charged such that usage of the active and inactive portions of the foldable display is substantially uniform.

9. The method of claim 8, further comprising periodically activating the inactive portion of the foldable display while the information handling device is connected to a battery power supply.

10. The method of claim 8, wherein the one or more characteristics comprise one or more of color attributes and brightness attributes for a plurality of pixels of the active portion of the foldable display.

11. The method of claim 10, wherein the one or more characteristics comprise averages of one or more of the color attributes and the brightness attributes for the plurality of pixels of the active portion of the foldable display over a predetermined tracking period.

12. The method of claim 8, further comprising selecting one or more images for activating the inactive portion of the foldable display comprising characteristics that satisfy a predetermined threshold, the predetermined threshold determined as a function of the one or more characteristics of the active portion of the foldable display and the acceleration factor.

13. The method of claim 8, further comprising:

determining a fold boundary where the foldable display is folded between the active portion of the foldable display and the inactive portion of the foldable display; and activating a plurality of pixels along the fold boundary in both the active and inactive portions of the foldable display according to one or more characteristics of the pixels along the fold boundary to reduce the noticeability of the fold boundary.

14. A program product comprising a non-transitory computer readable storage medium that stores code executable by a processor, the executable code comprising code to perform:

tracking one or more characteristics of an active portion of a foldable display of an information handling device, the active portion of the foldable display comprising a portion of the foldable display that is enabled when the display is folded;

determining an inactive portion of the foldable display that is disabled while the active portion of the foldable display is enabled when the display is folded;

selecting one or more images to display on the inactive portion of the foldable display, based on the one or more characteristics of the active portion of the foldable display, the one or more images selected based on an acceleration factor, the acceleration factor determined as a function of an amount of time remaining to fully charge the information handling device; and activating the inactive portion of the foldable display by displaying the one or more images on the inactive portion of the foldable display while the information handling device is being charged such that usage of the active and inactive portions of the foldable display is substantially uniform.

* * * * *